(12) United States Patent
Vitruk

(10) Patent No.: US 6,711,201 B2
(45) Date of Patent: Mar. 23, 2004

(54) TRUNCATED RIDGE WAVEGUIDE FOR ALL-METAL GAS LASER EXCITATION

(76) Inventor: Peter Vitruk, 20029 99$^{th}$ Ct. NE., Bothell, WA (US) 98011

( * ) Notice: Subject to any disclaimer, the term of this patent is extended or adjusted under 35 U.S.C. 154(b) by 0 days.

(21) Appl. No.: 10/098,677

(22) Filed: Mar. 15, 2002

(65) Prior Publication Data
US 2002/0131469 A1 Sep. 19, 2002

Related U.S. Application Data
(60) Provisional application No. 60/276,818, filed on Mar. 17, 2001.

(51) Int. Cl.$^7$ ............................. H01S 3/03; H01S 3/097
(52) U.S. Cl. ........................................... 372/64; 372/87
(58) Field of Search .............................. 372/64, 82, 87

(56) References Cited

U.S. PATENT DOCUMENTS

| | | | |
|---|---|---|---|
| 4,169,251 A | | 9/1979 | Laakmann ............. 331/94.5 G |
| 4,373,202 A | * | 2/1983 | Laakmann et al. ........... 372/64 |
| 4,472,808 A | * | 9/1984 | Suzuki ........................ 372/64 |
| 4,481,634 A | * | 11/1984 | Grossman et al. ............ 372/87 |
| 4,719,640 A | * | 1/1988 | Chenausky et al. ........... 372/97 |
| 4,805,182 A | * | 2/1989 | Laakmann .................... 372/82 |
| 4,807,234 A | * | 2/1989 | Hart et al. .................... 372/18 |
| 4,955,035 A | * | 9/1990 | Gekat .......................... 372/69 |
| 4,972,421 A | * | 11/1990 | Hongo et al. ................... 372/7 |
| 5,065,405 A | * | 11/1991 | Laakmann et al. ............ 372/92 |
| 5,177,748 A | * | 1/1993 | Zhang .......................... 372/18 |
| 5,224,117 A | * | 6/1993 | Kruger et al. ................. 372/82 |
| 5,379,317 A | * | 1/1995 | Bridges et al. ............... 372/64 |
| 5,822,354 A | * | 10/1998 | Vitruk .......................... 372/92 |
| 5,953,360 A | * | 9/1999 | Vitruk et al. .................. 372/87 |
| 6,192,061 B1 | * | 2/2001 | Hart et al. ..................... 372/87 |

OTHER PUBLICATIONS

U.S. patent application Ser. No. 09/397,434, Vitruk.
IEEE, J. Quantum, 1994, P. Vitruck et al., Electr., v. 30, #7, p. 1623.

* cited by examiner

Primary Examiner—David Porta
Assistant Examiner—Davienne Monbleau

(57) ABSTRACT

Truncated ridge waveguide for all-metal gas laser excitation according to present invention consists of a metal tube and a pair of endplates forming a vacuum envelope for containing a laser gas, a laser resonator mirrors placed on the endplates at the opposite ends of the tube and at least one elongated metal ridge electrode located within and conductively connected to the metal tube by at least one metal post to define a truncated ridge waveguide. The tube and the ridge electrode are shaped and positioned so as to define at least one elongated laser bore channel and a low thermal resistance and high capacitance ridge-to-tube gap therebetween. The ridge electrode and metal posts form truncated ridge to increase the ridge waveguide structure inductance, which together with high capacitance of the electrode-to-tube gap decreases the resonant frequency from the microwave band into the VHF band (30–300 MHz), which is the most suitable for $CO_2$ laser excitation. Present invention is characterized by lower cost, simpler tube and electrode design and more efficient RF discharge plasma cooling by the inner wall of the metal tube acting as one of the discharge electrodes, and by a ridge acting as a second discharge electrode.

18 Claims, 1 Drawing Sheet

TRUNCATED RIDGE WAVEGUIDE FOR ALL-METAL GAS LASER EXCITATION

REFERENCE TO PROVISIONAL APPLICATION

This application claims the benefit of the U.S. Provisional Application No. 60/276,818, filed Mar. 17, 2001.

TECHNICAL FIELD

This invention relates to radio-frequency (RF) excited gas lasers, especially to diffusion-cooled low and medium power $CO_2$ lasers.

BACKGROUND OF INVENTION

Prior art RF excited gas laser design pioneered by Katherine D. Laakmann (U.S. Pat. No. 4,169,251) defines an elongated laser resonator chamber being excited by transversely applied radio frequency (RF) field. This basic design of RF excited laser has been further advanced by Peter Laakmann (U.S. Pat. No. 4,805,182) through all-metal laser tube arrangement having metal electrodes and metal side-walls forming an elongated laser resonator chamber with electrodes and side-walls being diffusion-cooled by closely spaced walls of the metal tube envelope. No additional cooling of the electrodes (e.g. by liquid flowing through the electrodes) is required, which is a great advantage of this design. A disadvantage of this design is due to complexity of laser tube assembly and numerous components needed to build such a tube.

Another prior art laser design (Kruger et. al., U.S. Pat. No. 5,224,117) uses microwave excited, diffusion cooled, ridge waveguide electrode structure, which can be directly cooled through the ridge electrodes. This laser does not require additional elements such as an electrode support structure, resonant inductor coils, etc. A disadvantage of this design is that it is not applicable to 30–300 MHz excitation frequency range, which is the most effective and practical for $CO_2$ laser excitation (Vitruk, Hall and Baker, *IEEE J Quantum Electron.*, 30, 1623 (1994)).

Another prior art laser (P. Vitruk, pending U.S. patent application Ser. No. 09/397,434) is based on truncated ridge waveguide tube concept with resonant frequencies in 30–300 MHz band and having two ridge electrode design. Truncating the ridge significantly increases ridge structure inductance, which together with high capacitance of large area slabs electrodes allows reducing the ridge waveguide resonant frequencies from GHz band down to 30–300 MHz VHF band. This design is the most suited for high power slab laser operations requiring liquid cooling of discharge electrodes. However, commercial low power lasers do not benefit from this two ridge design since these lasers cannot use liquid cooling—it is extremely cost prohibiting for laser manufacturing and for later stage system level integration. A different cooling mechanism is needed for such low cost and low power lasers. Furthermore, small discharge electrode area in a low power laser leads to low inter-electrode (or inter-ridge) capacitance, which would cause an unacceptably high ridge waveguide resonant frequency and which is another disadvantage of ridge waveguide laser tube design when applied to low power RF excited lasers.

It is an object of the present invention to reduce the cost and to simplify the electrode support structure design used in gas lasers with RF excitation in 30–300 MHz band, which is the best suited for sealed $CO_2$ laser excitation. It is a further object of the current invention to improve and simplify the cooling of electrode structure.

SUMMARY OF INVENTION

Truncated ridge waveguide for all-metal gas laser excitation according to present invention consists of a metal tube and a pair of endplates forming a vacuum envelope for containing a laser gas, a laser resonator mirrors placed on the endplates at the opposite ends of the tube and at least one elongated metal ridge electrode located within and conductively connected to the metal tube by at least one metal post to define a truncated ridge waveguide. The tube and the ridge electrode are shaped and positioned so as to define at least one elongated laser bore channel and a low thermal resistance and high capacitance ridge-to-tube gap therebetween. The ridge electrode and metal posts form truncated ridge to increase the ridge waveguide structure inductance, which together with high capacitance of the electrode-to-tube gap decreases the resonant frequency from the microwave band into the VHF band (30–300 MHz), which is the most suitable for $CO_2$ laser excitation. Present invention is characterized by lower cost, simpler tube and electrode design and more efficient RF discharge plasma cooling by the inner wall of the metal tube acting as one of the discharge electrodes, and by a ridge acting as a second discharge electrode.

DETAILED DESCRIPTION OF THE INVENTION

Figure 1:
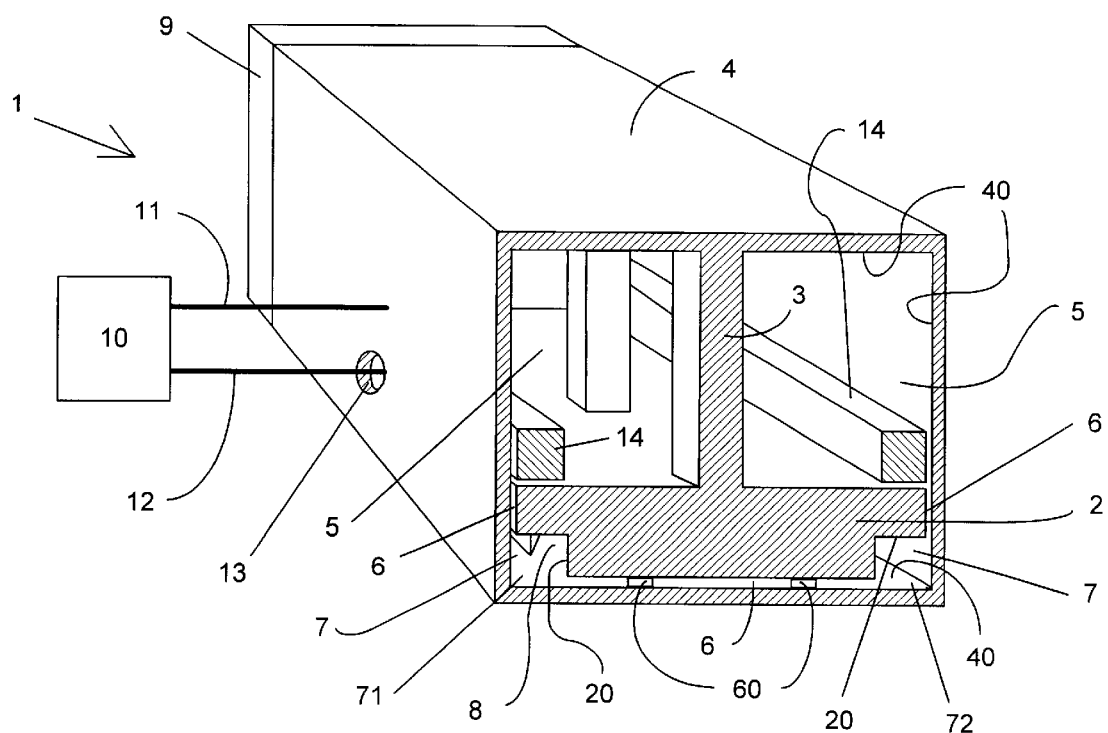
FIG. 1 is an isometric schematic diagram of the truncated ridge waveguide laser.

FIG. 1 is an isometric schematic diagram of the truncated ridge waveguide laser 1 consisting of the metal ridge electrode 2 connected by metal posts 3 to tube 4, and the large volume cavities 5 formed by the inner walls 40 of the metal tube 4. Laser 1 is filled with laser gas mixture, e.g. mixture of $CO_2$, $N_2$, He and Xe in case of $CO_2$ laser. Electrode 2 and posts 3 form a truncated ridge of the truncated ridge waveguide 1 having an increased ridge waveguide structure inductance, which decreases the resonant frequency of the ridge waveguide. Additionally, large area surfaces of the ridge electrode 2 are spaced from the inner walls 40 of the tube 4 by a narrow electrode-to-tube (or ridge-to-tube) gaps 6 in order to increase electrode-to-tube capacitance (or ridge-to-tube capacitance), which further reduces the resonance frequency of the ridge waveguide structure from the microwave band into the VHF band (30–300 MHz), which is the most suitable for $CO_2$ laser excitation. Gaps 6 are maintained by a plurality of ceramic spacers 60. The shape and number of posts 3 is chosen to resonate the ridge waveguide structure at the desired frequency.

Elongated laser bore channels 7 are formed by surfaces 20 of the electrode 2 and inner walls 40 of the metal tube 4. Channels 7 could be either of rectangular or square or other cross-sectional shape. Laser resonator cavity is formed by at least one channel 7 and laser mirrors located on the endplates 9 at the both ends of the tube 4. Alternatively to single bore laser resonator, a z-fold resonator could be used, which includes two axial channels 7 located in respective bottom corners 71 and 72 of the tube 4 and at least one diagonal channel 8 machined into the electrode 2 and connecting the opposite ends of the axial channels 7. Some or all surfaces 20 and 40 surrounding the laser bore channels 7 need to be dielectrically coated in order to minimize laser resonator optical losses.

RF power source 10 and connectors 11 and 12 serve as means for applying alternating electrical current between ridge electrode 2 and tube 4 to establish a gas plasma discharge lasing medium in laser bore channels 7. Connector 12 is a vacuum sealed feed-through placed through the opening 13 through the wall of the tube 4. Connector 11 between power source 10 and metal tube 4 provides for the RF current ground return. The inner wall 40 enclosing channel 7 is acting as one of the discharge electrodes (grounded electrode), and the ridge electrode surface 20 enclosing channel 7 is acting as a second, high voltage potential electrode. Elongated spacers 14 positioned in close proximity to both electrode 2 and inner wall 40 and which could be made of either ceramic or metal, are intended to prevent the plasma forming between electrode 2 and walls 40 outside of channels 7. Present design eliminates unwanted plasma in gaps 6 by narrowing them to less than the ion sheath thickness reported in Vitruk, Hall and Baker, *IEEE J Quantum Electron.*, 30, 1623 (1994). Resonance frequency of truncated ridge waveguide 1 is defined by the ridge-to-tube gap 6 capacitance and by the inductance of posts 3 and needs to be approximately 2–10% greater than the operating frequency of the RF power source 10.

Plasma in laser bore channels 7 is diffusion cooled directly by the metal tube 4 and by the electrode 2. Electrode 2, in its turn, is diffusion-cooled by the metal tube 4 through the low thermal resistance, large-area and narrow electrode-to-tube gaps 6. Since the inner wall 40 serves both as an electrode and a heat-sink conducting the heat away from channel 7 to the outer surface of the tube 4, it allows to maintain the gas temperature in channel 7 significantly lower than in prior art commercially available lasers (U.S. Pat. No. 4,805,182) and without employing a liquid cooling of the electrode 2.

Preferred embodiment of the present invention is a low power $CO_2$ gas laser having a truncated ridge waveguide design schematically shown in FIG. 1 and having a z-fold free-space resonator with $0.5 \times 0.5$ cm$^2$ aperture laser bore channels 7. Alternatively, laser bore aperture could be chosen in the range of 0.2–0.3 cm to define a waveguide laser resonator. Each metal electrode 2 is approximately 30 cm long and attached to the inner walls 40 of a square (5 cm×5 cm) aluminum extrusion tube 4 by two aluminum posts 3 having diameter 0.6 cm. Calculated resonant frequency for this truncated ridge waveguide electrode structure is approximately 82–85 MHz with a Q-factor in excess of approximately 400–500. Truncated ridge waveguide all-metal laser according to present invention uses substantially fewer parts and requires less sophisticated laser assembly procedures and thus would allow for substantial manufacturing cost reduction.

It should be understood that even though numerous features and advantages of the present invention have been set forth, the above disclosure is illustrative only. For example, a plurality of RF driven ridge electrodes could be used while the inner walls of the tube might not necessarily be used as the main discharge electrodes though it still would remove heat from the plasma filled laser bore channels. Changes may be made in detail and yet remain within the broad principles of the present invention. Accordingly, the invention is not limited except as by the following claims.

What is claimed is:

1. All-metal gas laser with radio-frequency excitation, comprising:
   metal tube and a pair of endplates at the opposite ends of the tube forming a vacuum envelope for containing a laser gas, said metal tube having an inner wall; and
   laser resonator mirrors placed on the endplates at the opposite ends of the tube; and
   at least one elongated metal ridge located within the metal tube and conductively connected to the metal tube to define a ridge waveguide; and
   means for applying alternating electrical current between said ridge and said tube,
   wherein said ridge and said inner wall having their surfaces shaped and positioned so as to define at least one elongated laser bore channel and a low thermal resistance and high capacitance ridge-to-tube gap therebetween, said ridge is truncated so as to define a ridge waveguide resonance frequency in 30–300 MHz band, said channel is filled with gas plasma discharge lasing medium excitable by said means, said channel is formed by the portions of the ridge and inner wall surfaces and is shaped to have an aperture greater then plasma discharge ion sheath thickness and in the range between 0.2 and 0.5 cm, said gap is formed by the closest spaced portions of the ridge and inner wall surfaces and is less then plasma discharge ion sheath thickness.

2. The laser of claim 1 wherein said channel having rectangular cross-section.

3. The laser of claim 1 wherein said channel having square cross-section.

4. The laser of claim 1 wherein said laser further includes spacers positioned between and in close proximity to said ridge and said inner wall.

5. The laser of claim 1 wherein said means for applying alternating electrical current include RF power source and at least one electrical feed-through to deliver said electrical current through at least one opening in the inner wall of the tube, said feed-through being vacuum sealed to the inner wall of the tube.

6. The laser of claim 1 wherein surfaces of the said channel are light reflecting surfaces.

7. The laser of claim 1 wherein at least one surface within said channel is dielectrically coated.

8. The laser of claim 1 wherein at least on of the surfaces of said channel is made of dielectric material.

9. The laser of claim 1 wherein said laser gas includes $CO_2$, $N_2$ and He.

10. All-metal gas laser with radio-frequency excitation, comprising:
    metal tube and a pair of endplates at the opposite ends of the tube forming a vacuum envelope for containing a laser gas, said metal tube having an inner wall; and
    laser resonator mirrors placed on the endplates at the opposite ends of the tube; and
    at least one elongated metal electrode located within the metal tube; and
    means for applying alternating electrical current between said electrode and said tube;
    wherein said electrode and said inner wall having their surfaces shaped and positioned as to define at least one elongated laser bore channel and a low thermal resistance and high capacitance electrode-to-tube gap therebetween, said electrode is connected to the inner wall of the tube by at least one metal post, said post together with the electrode and the inner wall of the tube defining an interelectrode inductance that resonates with said electrode-to-tube capacitance at a frequency in 30–300 MHz band, said channel is filled with gas plasma discharge lasing medium excitable by said means, said channel is formed by the portions of the ridge and inner wall surfaces and is shaped to have an aperture greater then plasma discharge ion sheath thickness and in the range between 0.2 and 0.5 cm, said gap is formed by the closest spaced portions of the ridge and inner wall surfaces and is less then plasma discharge ion sheath thickness.

11. The laser of claim 10 wherein said channel having rectangular cross-section.

12. The laser of claim 10 wherein said channel having square cross-section.

13. The laser of claim 10 wherein said laser further includes spacers positioned between and in close proximity to said electrode and said inner wall.

14. The laser of claim 10 wherein said means for applying alternating electrical current include RF power source and at least one electrical feed-through to deliver said electrical current through at least one opening in the inner wall of the tube, said feed-throughs being vacuum sealed to the inner walls of the tube.

15. The laser of claim 10 wherein surfaces of said channel is light reflecting surfaces.

16. The laser of claim 10 wherein at least on of the surfaces of said channel is dielectrically coated.

17. The laser of claim 10 wherein at least on of the surfaces of said channel is made of dielectric material.

18. The laser of claim 10 wherein said laser gas includes $CO_2$, $N_2$ and He.

* * * * *